(12) United States Patent
Toyoda et al.

(10) Patent No.: US 10,461,576 B2
(45) Date of Patent: Oct. 29, 2019

(54) UNINTERRUPTIBLE POWER SUPPLY APPARATUS

(71) Applicant: TOSHIBA MITSUBISHI-ELECTRIC INDUSTRIAL SYSTEMS CORPORATION, Chuo-ku (JP)

(72) Inventors: Masaru Toyoda, Chuo-ku (JP); Masahiro Kinoshita, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 265 days.

(21) Appl. No.: 15/517,188

(22) PCT Filed: Dec. 8, 2014

(86) PCT No.: PCT/JP2014/082416
§ 371 (c)(1),
(2) Date: Apr. 6, 2017

(87) PCT Pub. No.: WO2016/092613
PCT Pub. Date: Jun. 16, 2016

(65) Prior Publication Data
US 2017/0302105 A1   Oct. 19, 2017

(51) Int. Cl.
*H02J 9/06* (2006.01)
*H02M 5/458* (2006.01)
(Continued)

(52) U.S. Cl.
CPC ........... *H02J 9/062* (2013.01); *H02M 3/1588* (2013.01); *H02M 5/458* (2013.01);
(Continued)

(58) Field of Classification Search
CPC .... H02M 5/458; H02M 3/1588; H02M 7/217; H02M 2001/0054; Y02B 70/1491; H02J 9/062
See application file for complete search history.

(56) References Cited

U.S. PATENT DOCUMENTS

| 2007/0210652 A1* | 9/2007 | Tracy ............. | H02J 9/062 307/66 |
| 2012/0212051 A1* | 8/2012 | Heidenreich ....... | H02J 9/062 307/23 |

(Continued)

FOREIGN PATENT DOCUMENTS

JP  2003-9419 A   1/2003
JP  2008-278558 A  11/2008
(Continued)

OTHER PUBLICATIONS

Office Action dated Jun. 5, 2018 in Japanese Patent Application No. 2016-563307 (with English language translation).
(Continued)

*Primary Examiner* — Jared Fureman
*Assistant Examiner* — Duc M Pham
(74) *Attorney, Agent, or Firm* — Oblon, McClelland, Maier & Neustadt, L.L.P.

(57) ABSTRACT

The present uninterruptible power supply apparatus includes a converter (5) configured to convert AC power into DC power; an inverter (10) configured to convert DC power into AC power and supply the converted AC power to a load (24); and a control device (18) configured to control the converter (5) and the inverter (10). The control device (18) is configured to execute a mode selected from a sinusoidal wave output mode and a waveform distortion generation mode. In the sinusoidal wave output mode, an AC voltage (VO) with a sinusoidal waveform and with no waveform distortion is supplied to the load (24). In the waveform distortion generation mode, an AC voltage (VO) with waveform distortion within an allowable range for the load (24) is supplied to the load (24).

11 Claims, 7 Drawing Sheets

(51) Int. Cl.
  *H02M 3/158* (2006.01)
  *H02M 7/217* (2006.01)
  *H02M 7/537* (2006.01)
  *H02M 7/5395* (2006.01)
  *H02M 1/00* (2006.01)

(52) U.S. Cl.
  CPC ......... *H02M 5/4585* (2013.01); *H02M 7/217* (2013.01); *H02M 7/537* (2013.01); *H02M 7/5395* (2013.01); *H02M 2001/0054* (2013.01); *Y02B 70/1491* (2013.01)

(56) References Cited

U.S. PATENT DOCUMENTS

| 2015/0180232 A1* | 6/2015 | Mino | H02J 1/08 307/23 |
| 2016/0006295 A1* | 1/2016 | Yang | H02J 9/062 307/66 |

FOREIGN PATENT DOCUMENTS

| JP | 2008278558 | * 11/2008 | ............... H02J 9/06 |
| JP | 2008827558 | * 11/2008 | ............... H02J 9/06 |
| JP | 2010-124557 A | 6/2010 | |

OTHER PUBLICATIONS

Extended European Search Report dated Jul. 13, 2018 in Patent Application No. 14907792.7.

Seung-Beom Lim, et al., "A New Single Phase Double-Conversion Ups Using PWAM Method", IEEE 6$^{th}$ International Power Electronics and Motion Control Conference, XP031535548, 2009, pp. 2507-2511.

International Search Report dated Jan. 13, 2015 in PCT/JP2014/082416 filed Dec. 8, 2014.

Office Action dated Jul. 3, 2019 in Chinese Patent Application No. 201480083780.9, with English translation.

* cited by examiner (a) SINUSOIDAL WAVE OUTPUT MODE (b) WAVEFORM DISTORTION GENERATION MODE (a)

(b)

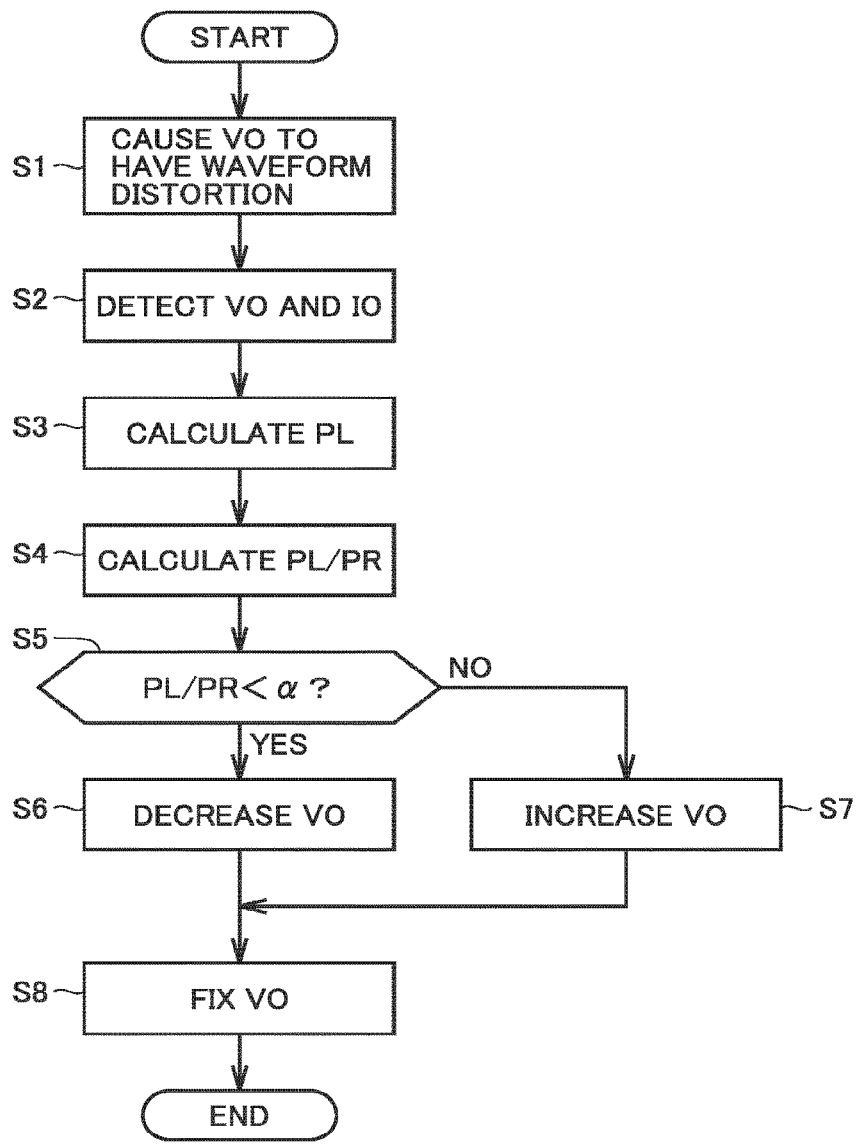

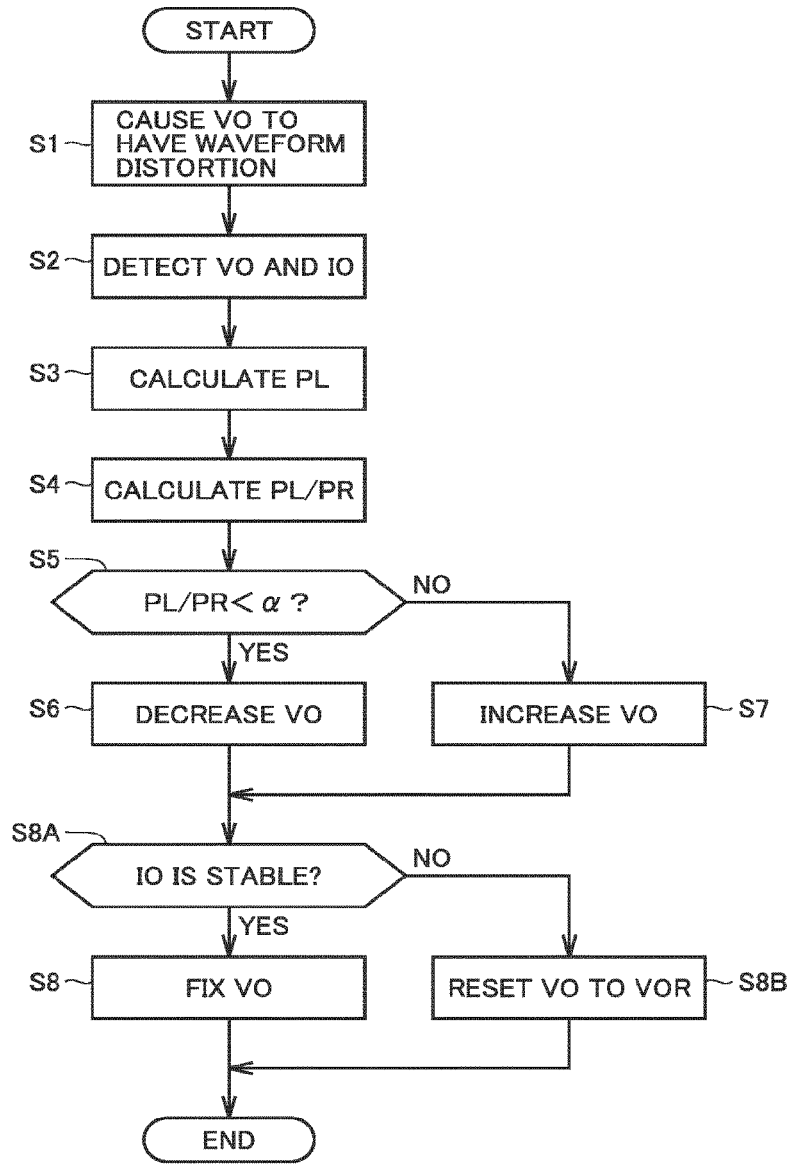

UNINTERRUPTIBLE POWER SUPPLY APPARATUS

TECHNICAL FIELD

The present invention relates to an uninterruptible power supply apparatus, and particularly to an uninterruptible power supply apparatus including a converter configured to convert alternating-current (AC) power supplied from a commercial AC power source into direct-current (DC) power, and including an inverter configured to convert DC power into AC power and supply the converted AC power to a load.

BACKGROUND ART

For example, Japanese Patent Laying-Open No. 2010-124557 (PTD 1) discloses an uninterruptible power supply apparatus including a converter, an inverter, and a DC step-up/step-down device. The converter converts AC power supplied from a commercial AC power source into DC power. The inverter converts DC power into AC power and supplies the converted AC power to a load. During a normal time when AC power is supplied from the commercial AC power source, the DC step-up/step-down device supplies DC power produced in the converter to a storage battery, and during a power failure time when supply of AC power from the commercial AC power source is stopped, the DC step-up/step-down device supplies DC power from the storage battery to the inverter. Thus, in the case of a power failure, the operation of the load can be continued as long as DC power is stored in the storage battery.

CITATION LIST

Patent Document

PTD 1: Japanese Patent Laying-Open No. 2010-124557

SUMMARY OF INVENTION

Technical Problem

Even in the case where the AC voltage from the commercial AC power supply has waveform distortion, the uninterruptible power supply apparatus as described above supplies an AC voltage with a sinusoidal waveform and with no waveform distortion to a load. However, an AC voltage with waveform distortion can also be supplied to the load as long as the waveform distortion falls within an allowable range for the load. Furthermore, the efficiency of the uninterruptible power supply apparatus may be higher when the AC voltage with waveform distortion is supplied than when the AC voltage with no waveform distortion is supplied.

A main object of the present invention, therefore, is to provide an uninterruptible power supply apparatus having high efficiency.

Solution to Problem

An uninterruptible power supply apparatus according to the present invention includes: a converter configured to convert AC power supplied from a commercial AC power source into DC power; an inverter configured to convert DC power into AC power and supply the AC power to a load; and a control device configured to control the converter and the inverter. During a normal time when the AC power is supplied from the commercial AC power source, the DC power generated in the converter is supplied to the inverter and is stored in a power storage device, and during a power failure time when supply of the AC power from the commercial AC power source is stopped, the DC power in the power storage device is supplied to the inverter. The control device is configured to execute a mode selected from a first mode and a second mode. In the first mode, an AC voltage with a sinusoidal waveform and with no waveform distortion is supplied to the load. In the second mode, an AC voltage with waveform distortion falling within an allowable range for the load is supplied to the load.

Advantageous Effects of Invention

In the uninterruptible power supply apparatus according to the present invention, since the AC voltage selected from the AC voltage with no waveform distortion and the AC voltage with waveform distortion is supplied to the load, the efficiency can be enhanced more as compared with the conventional case where only an AC voltage with no waveform distortion can be supplied to the load.

BRIEF DESCRIPTION OF DRAWINGS

FIG. 9 is a flowchart showing the operation during a waveform distortion generation mode of a control device included in the uninterruptible power supply apparatus according to the second embodiment.

FIG. 10 is a flowchart showing a modification of the second embodiment.

DESCRIPTION OF EMBODIMENTS

First Embodiment

Figure 1:
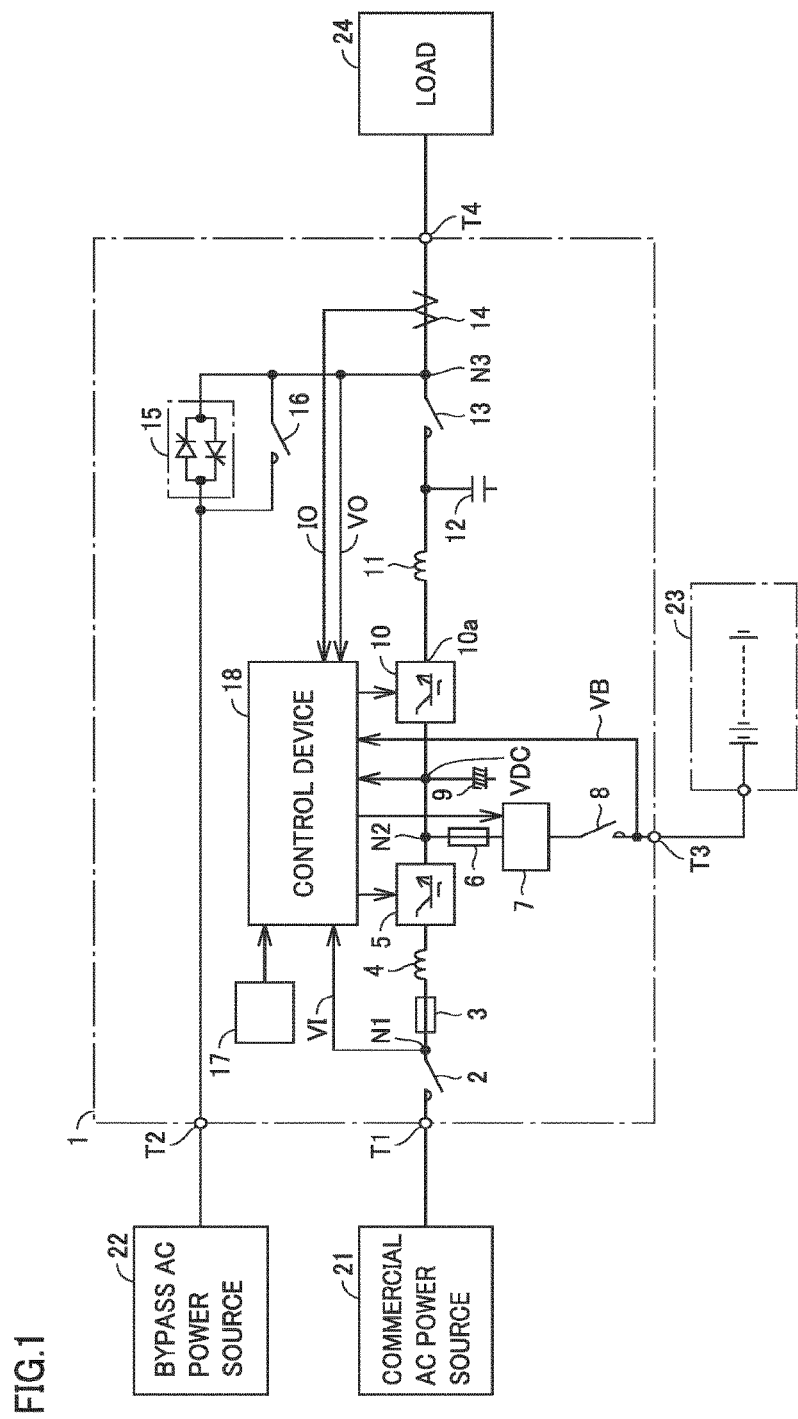
FIG. 1 is a circuit block diagram showing the configuration of an uninterruptible power supply apparatus according to the first embodiment of the present invention.

FIG. 1 is a circuit block diagram showing the configuration of an uninterruptible power supply apparatus 1 according to the first embodiment of the present invention. Uninterruptible power supply apparatus 1 converts three-phase AC power from a commercial AC power source 21 into DC power, and then converts the DC power into three-phase AC power to supply the converted power to a load 24. FIG. 1, however, shows a circuit for only a single phase for simplicity of the drawing and the explanation.

In FIG. 1, uninterruptible power supply apparatus 1 includes an AC input terminal T1, a bypass input terminal T2, a battery terminal T3, and an AC output terminal T4. AC input terminal T1 receives AC power having a commercial frequency from commercial AC power source 21. Bypass input terminal T2 receives AC power having a commercial frequency from a bypass AC power source 22. Bypass AC power source 22 may be a commercial AC power source or may be a power generator.

Battery terminal T3 is connected to a battery (power storage device) 23. Battery 23 stores DC power. A capacitor may be connected instead of battery 23. AC output terminal T4 is connected to load 24. Load 24 is driven with AC power. Although it is preferable that load 24 is driven with the AC voltage of a rated voltage having a sinusoidal waveform and having no waveform distortion, load 24 can also be driven with the AC voltage that falls within the range of input voltage allowable for load 24 and that has waveform distortion within the range allowable for load 24.

Uninterruptible power supply apparatus 1 further includes electromagnetic contactors 2, 8, 13, 16, protective fuses 3, 6, AC reactors 4, 11, a converter 5, a bidirectional chopper 7, a smoothing electrolytic capacitor 9, an inverter 10, a capacitor 12, a current detector 14, a semiconductor switch 15, an operation unit 17, and a control device 18.

Electromagnetic contactor 2, protective fuse 3, and AC reactor 4 are connected in series between AC input terminal T1 and an input node of converter 5. Electromagnetic contactor 2 is ON during use of uninterruptible power supply apparatus 1, and is OFF during, for example, maintenance of uninterruptible power supply apparatus 1. An instantaneous value of an AC input voltage VI appearing at a node N1 between electromagnetic contactor 2 and protective fuse 3 is detected by control device 18. Based on a detected value of AC input voltage VI, for example, it is determined whether a power failure has occurred or not.

Protective fuse 3 is blown to protect uninterruptible power supply apparatus 1 and other components if an overcurrent flows. AC reactor 4 constitutes a low-pass filter that allows AC power having a commercial frequency to pass from commercial AC power source 21 to converter 5 and that prevents a signal having a switching frequency generated in converter 5 from passing through commercial AC power source 21.

Converter 5 is a forward converter and is controlled by control device 18. During a normal time when AC power is supplied from commercial AC power source 21, converter 5 converts AC power into DC power and outputs the converted power to a power source node N2. During a power failure time when supply of AC power from commercial AC power source 21 is stopped, the operation of converter 5 is stopped. An output voltage of converter 5 can be controlled to be a desired value. Smoothing electrolytic capacitor 9 is connected to power source node N2 and smoothes a voltage on power source node N2. An instantaneous value of a DC voltage VDC appearing at power source node N2 is detected by control device 18.

Protective fuse 6 is connected between power source node N2 and a high voltage-side node of bidirectional chopper 7 and is blown to protect uninterruptible power supply apparatus 1, battery 23, and other components if an overcurrent flows. A low voltage-side node of bidirectional chopper 7 is connected to battery terminal T3 through electromagnetic contactor 8. Electromagnetic contactor 8 is ON during use of uninterruptible power supply apparatus 1, and is OFF during, for example, maintenance of uninterruptible power supply apparatus 1 and battery 23. An instantaneous value of an inter-terminal voltage VB on battery 23 appearing at battery terminal T3 is detected by control device 18.

Bidirectional chopper 7 is a DC step-up/step-down circuit and is controlled by control device 18. During a normal time when AC power is supplied from commercial AC power source 21, bidirectional chopper 7 stores DC power generated by converter 5 in battery 23. During a power failure time when supply of AC power from commercial AC power source 21 is stopped, bidirectional chopper 7 supplies DC power in battery 23 to inverter 10 through power source node N2.

When storing DC power in battery 23, bidirectional chopper 7 lowers DC voltage VDC on power source node N2 to a DC voltage having a predetermined value and provides the lowered DC voltage to battery 23. When supplying DC power of battery 23 to inverter 10, bidirectional chopper 7 raises inter-terminal voltage VB of battery 23 to a DC voltage having a predetermined value and outputs the raised DC voltage to power source node N2. Power source node N2 is connected to an input node of inverter 10.

Inverter 10 is an inverter controlled by control device 18. Inverter 10 converts DC power supplied from converter 5 or bidirectional chopper 7 through power source node N2 into AC power having a commercial frequency and outputs the converted AC power to an output node 10a. That is, during a normal time, inverter 10 converts DC power supplied from converter 5 through power source node N2 into AC power, and during a power failure time, inverter 10 converts DC power supplied from battery 23 through bidirectional chopper 7 into AC power. An output voltage of inverter 10 can be controlled to be a desired value.

Output node 10a of inverter 10 is connected to one terminal of electromagnetic contactor 13 through AC reactor 11. The other terminal (node N3) of electromagnetic contactor 13 is connected to AC output terminal T4. Capacitor 12 is connected to one terminal of electromagnetic contactor 13. AC reactor 11 and capacitor 12 constitute a low-pass filter that allows AC power having a commercial frequency generated in inverter 10 to pass through AC output terminal T4 and that prevents a signal having a switching frequency generated in inverter 10 from passing through AC output terminal T4.

Electromagnetic contactor 13 is controlled by control device 18. Electromagnetic contactor 13 is ON during an inverter power feeding mode in which AC power generated by inverter 10 is supplied to load 24. Electromagnetic contactor 13 is OFF during a bypass power feeding mode in which AC power from bypass AC power source 22 is supplied to load 24.

An instantaneous value of an AC output voltage VO appearing at node N3 is detected by control device 18. Current detector 14 detects a load current IO flowing between node N3 and AC output terminal T4 and provides a signal representing the detected value to control device 18.

Semiconductor switch 15 includes a thyristor and is connected between bypass input terminal T2 and node N3. Electromagnetic contactor 16 is connected in parallel to semiconductor switch 15. Semiconductor switch 15 is controlled by control device 18. Semiconductor switch 15 is normally OFF, and, in the case of a malfunction of inverter 10, semiconductor switch 15 is instantaneously turned ON so that AC power from bypass AC power source 22 is supplied to load 24. Semiconductor switch 15 is turned OFF after a lapse of a predetermined period of time since semiconductor switch 15 has been turned ON.

Electromagnetic contactor 16 is OFF during the inverter power feeding mode in which AC power generated by inverter 10 is supplied to load 24. Electromagnetic contactor 16 is ON during the bypass power feeding mode in which AC power from bypass AC power source 22 is supplied to load 24. In the case of a malfunction of inverter 10, electromagnetic contactor 16 is turned ON so that AC power from bypass AC power source 22 is supplied to load 24. That is, in the case of a malfunction of inverter 10, semiconductor switch 15 is instantaneously turned ON and remains ON for a predetermined period of time and electromagnetic contactor 16 is turned ON. This is for preventing semiconductor switch 15 from being overheated and damaged.

Operation unit 17 includes components, such as a plurality of buttons to be operated by a user of uninterruptible power supply apparatus 1, and an image display to display various pieces of information. User's operation of operation unit 17 allows power-on/power-off of uninterruptible power supply apparatus 1, allows selection of one of the modes including the bypass power feeding mode, the inverter power feeding mode, a sinusoidal wave output mode (the first mode) described below, and a waveform distortion generation mode (the second mode) described below, and allows storage of various parameters in control device 18.

Control device 18 operates based on signals from operation unit 17, detects instantaneous values of AC input voltage VI, DC voltage VDC, battery voltage VB, AC output voltage VO, and load current IO, and controls the overall uninterruptible power supply apparatus 1 based on the detected values. That is, based on a detected value of AC input voltage VI, control device 18 detects whether a power failure has occurred or not, and controls converter 5 and inverter 10 in synchronization with the phase of AC input voltage VI.

Further, control device 18 controls converter 5 such that DC voltage VDC is a desired target DC voltage VDCT, and controls bidirectional chopper 7 such that battery voltage VB is a desired target battery voltage VBT. Further, when the sinusoidal wave output mode is selected by using operation unit 17, control device 18 controls inverter 10 such that output voltage VO is changed to have a sinusoidal waveform and becomes a rated voltage. Further, when the waveform distortion generation mode is selected by using operation unit 17, control device 18 causes output voltage VO to have waveform distortion.

Figure 2:
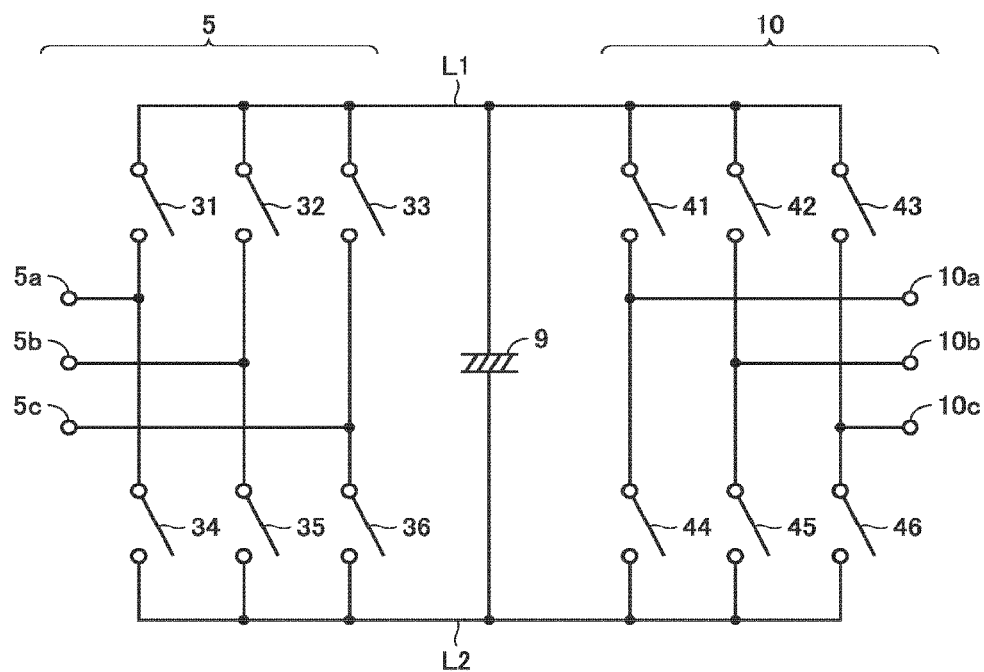
FIG. 2 is a circuit diagram showing the configuration of a converter and an inverter shown in FIG. 1.

FIG. 2 is a circuit diagram showing the configuration of converter 5 and inverter 10. In FIG. 2, converter 5 includes input nodes 5a to 5c and switching elements 31 to 36, and inverter 10 includes switching elements 41 to 46 and output nodes 10a to 10c.

Each of input nodes 5a to 5c of converter 5 receives a three-phase AC voltage from commercial AC power source 21. Switching elements 31 to 33 each have one electrode connected to a DC positive bus L1 and the other electrode connected to a corresponding one of input nodes 5a to 5c. Switching elements 34 to 36 each have one electrode connected to a corresponding one of input nodes 5a to 5c, and the other electrode connected to DC negative bus L2. Smoothing electrolytic capacitor 9 is connected between DC positive bus L1 and DC negative bus L2 and smoothes DC voltage VDC between buses L1 and L2.

Switching elements 41 to 43 of inverter 10 each have one electrode connected to DC positive bus L1 and the other electrode connected to a corresponding one of output nodes 10a to 10c. Switching elements 44 to 46 each have one electrode connected to a corresponding one of output nodes 10a to 10c, and the other electrode connected to DC negative bus L2. To each of switching elements 31 to 36 and 41 to 46, a diode is connected in anti-parallel. The diodes, however, are not shown for simplicity of the drawing and the explanation.

Each of switching elements 31 to 36 and 41 to 46 is controlled by control device 18 and is turned ON/OFF at predetermined timing in synchronization with a three-phase AC voltage VI from commercial AC power source 21. Switching elements 31 to 33 are turned ON/OFF in synchronization with three-phase AC voltage VI, and switching elements 34, 35 and 36 are respectively turned OFF/ON when switching elements 31, 32 and 33 are turned ON/OFF. Switching elements 41 to 43 are turned ON/OFF in synchronization with three-phase AC voltage VT, and switching elements 44, 45 and 46 are respectively turned OFF/ON when switching elements 41, 42 and 43 are turned ON/OFF.

DC voltage VDC can be adjusted to a desired voltage by adjusting a phase difference between three-phase AC voltage VI from commercial AC power source 21 and the timing at which switching elements 31 to 36 are turned ON/OFF. Output voltage VO can be adjusted to a desired voltage by adjusting a period of time for which each of switching elements 41 to 46 is ON.

Figure 3:
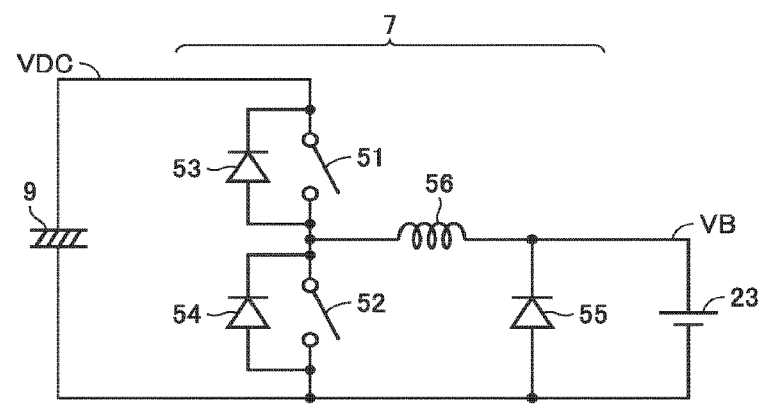
FIG. 3 is a circuit diagram showing the configuration of a bidirectional chopper shown in FIG. 1.

FIG. 3 is a circuit diagram showing the configuration of bidirectional chopper 7. In FIG. 3, bidirectional chopper 7 includes switching elements 51, 52, diodes 53 to 55, and a reactor 56. Switching elements 51, 52 are connected in series between the positive electrode and the negative electrode of smoothing electrolytic capacitor 9. Diodes 53, 54 are connected in antiparallel to switching elements 51, 52, respectively. Reactor 56 is connected between the positive electrode of battery 23 and the node between switching elements 51, 52. The negative electrode of battery 23 is connected to the negative electrode of smoothing electrolytic capacitor 9. Diode 55 has an anode and a cathode respectively connected to the negative electrode and the positive electrode of battery 23.

When battery 23 is to be charged, switching element 51 is turned ON/OFF in a prescribed period while switching element 52 is turned OFF. When switching element 51 is turned ON, a current flows from smoothing electrolytic capacitor 9 through switching element 51 and reactor 56 into battery 23, so that battery 23 is charged while electromagnetic energy is stored in reactor 56.

When switching element 52 is turned OFF, a current flows through a passage extending through reactor 56, battery 23 and diode 54, and then battery 23 is charged. Voltage VB on battery 23 becomes lower than voltage VDC of smoothing electrolytic capacitor 9. Battery voltage VB can be adjusted by adjusting the ratio between the turned-ON time and the turned-OFF time of switching element 51 in each period.

When battery 23 is to be discharged, switching element 52 is turned ON/OFF in a prescribed period while switching element 51 is turned OFF. When switching element 52 is turned ON, a current flows through a passage extending through battery 23, reactor 56 and switching element 52, and electromagnetic energy is stored in reactor 56.

When switching element 52 is turned OFF, a current flows from battery 23 through reactor 56 and diode 53 into smoothing electrolytic capacitor 9, so that smoothing electrolytic capacitor 9 is charged. Voltage VDC on smoothing electrolytic capacitor 9 becomes higher than voltage VB of battery 23 by the voltage generated in reactor 56. DC voltage VDC can be adjusted by adjusting the ratio between the turned-ON time and the turned-OFF time of switching element 52 in each period.

Figure 4:
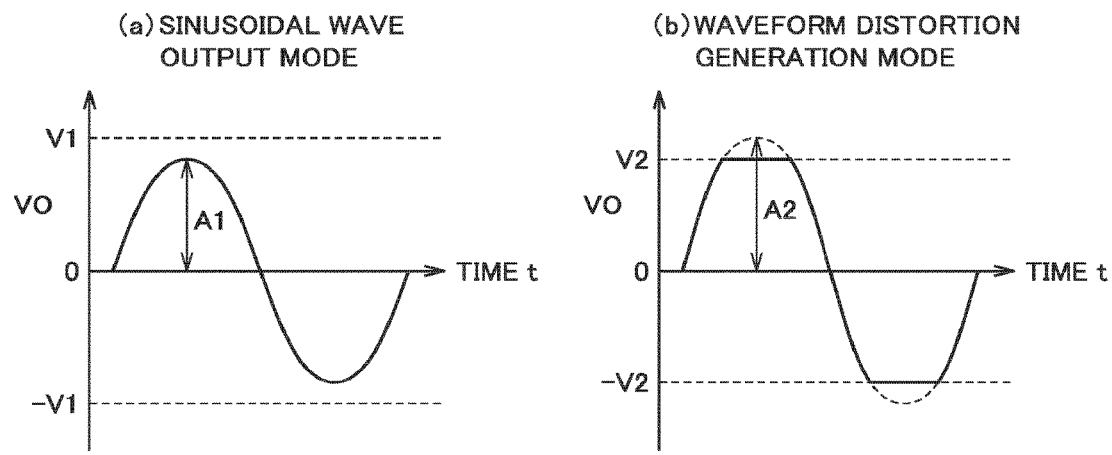
FIG. 4 is a time chart showing a waveform of an output voltage of an uninterruptible power supply apparatus shown in FIG. 1.

FIGS. 4(a) and 4(b) each are a time chart showing the waveform of output voltage VO. FIG. 4(a) shows a waveform of output voltage VO during the sinusoidal wave output mode while FIG. 4(b) shows a waveform of output voltage VO during the waveform distortion generation mode. As shown in FIG. 4(a), when the sinusoidal wave output mode is selected, control device 18 controls converter 5 or bidirectional chopper 7 such that DC voltage VDC reaches a prescribed value 2×V1, and controls inverter 10 so as to output AC voltage VO with a sinusoidal waveform and with an amplitude of a prescribed value A1 smaller than V1. In this mode, DC voltage V1 is greater than an amplitude A1 of AC voltage VO, so that output voltage VO has a sinusoidal wave with no distortion. Output voltage VO is kept at a fixed rated voltage.

As shown in FIG. 4(b), when the waveform distortion generation mode is selected, control device 18 controls converter 5 or bidirectional chopper 7 such that DC voltage VDC reaches a prescribed value 2×V2 smaller than 2V1, and controls inverter 10 so as to output AC voltage VO with a sinusoidal waveform and with an amplitude of a prescribed value A2 greater than V2. In this mode, DC voltage V2 is smaller than amplitude A2 of AC voltage VO. Accordingly, output voltage VO is limited to fall within a range of −V2 to +V2, with the result that output voltage VO has not a sinusoidal waveform but a trapezoidal waveform. Voltage VO of such a waveform is decomposed into a fundamental wave and a harmonic wave. The distortion ratio of voltage VO is represented, for example, by the ratio of the effective value of the harmonic component to the effective value of the fundamental wave. The distortion ratio of output voltage VO can be adjusted by adjusting the ratio or the difference between amplitude A2 and DC voltage V2.

Figure 5:
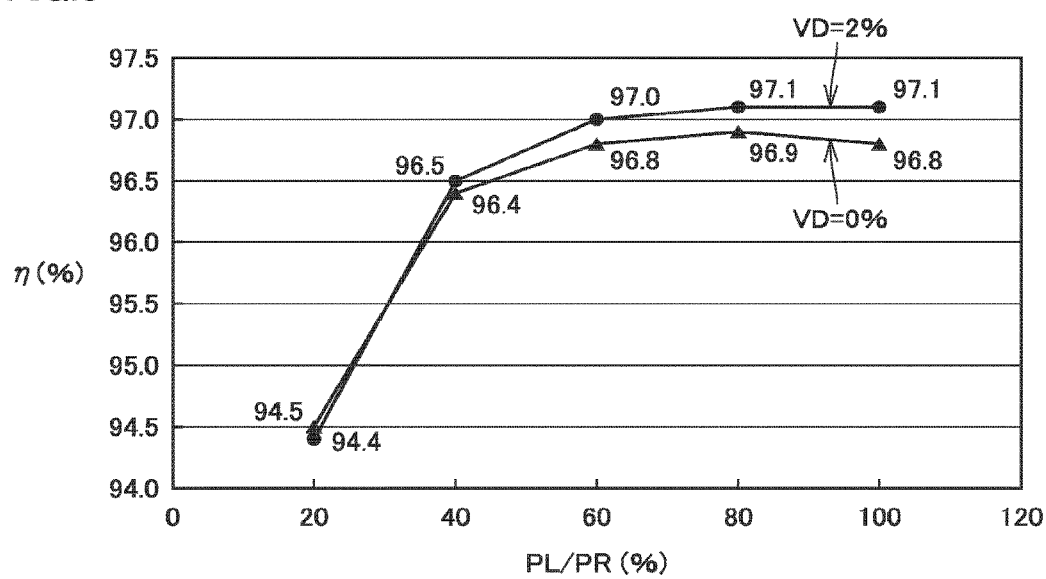
FIG. 5 is a diagram showing the relation among the ratio of a load capacity to a rated capacity of the uninterruptible power supply apparatus shown in FIG. 1, the efficiency of the uninterruptible power supply apparatus, and the distortion ratio of the output voltage.

FIG. 5 is a diagram showing the relation among a ratio PL/PR (%) of a load capacity PL to a rated capacity PR of uninterruptible power supply apparatus 1, efficiency η (%) of uninterruptible power supply apparatus 1, and distortion ratio VD (%) of output voltage VO. Efficiency η is a ratio PO/PI (%) of AC power PO that is supplied to load 24, to AC power PI that is supplied from commercial AC power source 21. When the sinusoidal wave output mode is selected to set distortion ratio VD of output voltage VO at 0%, efficiency η reaches 94.5%, 96.4%, 96.8%, 96.9%, and 96.8% on the condition that PL/PR is set at 20%, 40%, 60%, 80%, and 100%, respectively.

In contrast, when the waveform distortion generation mode is selected to set distortion ratio VD of output voltage VO at 2%, efficiency η reaches 94.4%, 96.5%, 97.0%, 97.1%, and 97.1% on the condition that PL/PR is set at 20%, 40%, 60%, 80%, and 100%, respectively. Accordingly, in the range of normal use in which PL/PR ranges from 40% to 100%, efficiency η is higher in the waveform distortion generation mode than in the sinusoidal wave output mode. This is because, since DC voltage V2 during the waveform distortion generation mode is lower than DC voltage V1 during the sinusoidal wave output mode, losses occurring in converter 5, inverter 10 and the like are smaller in the waveform distortion generation mode than in the sinusoidal wave output mode.

Figure 6:
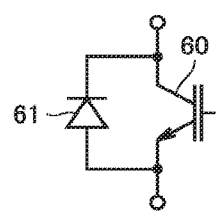
FIG. 6 is a circuit diagram illustrating the configuration of each switching element shown in FIG. 2.
Figure 6:
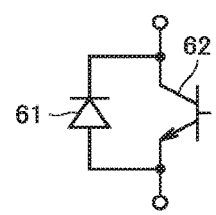

In other words, as shown in FIGS. 6(a) and 6(b), each of switching elements 31 to 36 included in converter 5 and switching elements 41 to 46 included in inverter 10 is constituted of an insulated gate bipolar transistor (IGBT) 60, an NPN bipolar transistor 62, or the like. To each of IGBT 60 or transistor 62, a diode 61 is connected in anti-parallel.

Figure 7:
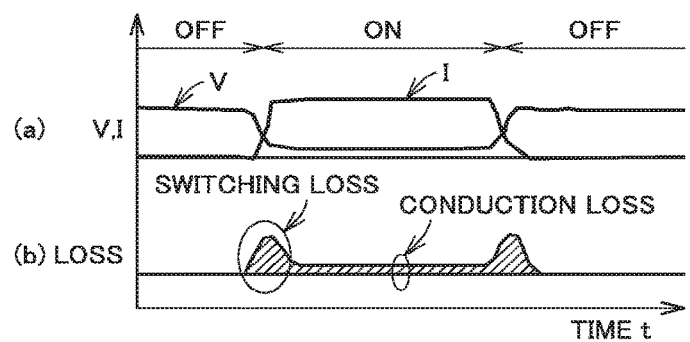
FIG. 7 is a time chart showing losses occurring in an IGBT shown in FIG. 6.

FIGS. 7(a) and 7(b) each are a time chart showing the ON/OFF operation of IGBT 60. FIG. 7(a) shows a collector-emitter voltage V and an emitter current I of IGBT 60. FIG. 7(b) shows losses produced at IGBT 60.

As shown in FIGS. 7(a) and 7(b), during a period when IGBT 60 is OFF, a resistance value of IGBT 60 is high enough for current I to be 0 A. Thus, no loss is produced at IGBT 60. During a period when IGBT 60 is ON, however, large current I flows through IGBT 60 and a resistance value of IGBT 60 is not 0Ω, leading to production of a conduction loss in IGBT 60.

When IGBT 60 is switched from an OFF state to an ON state or from an OFF state to an ON state, it takes a certain period of time for voltage V and current I to change, thereby causing a switching loss V×I. DC voltage VDC is decreased and collector-emitter voltage V on IGBT 60 is decreased, thereby allowing reduction in switching loss V×I. Since IGBT 60 is turned ON/OFF highly frequently in converter 5 and inverter 10, the reduction in switching loss provides great advantageous effects.

Thus, in the present first embodiment, when load 24 can be driven with AC voltage VO with waveform distortion, the waveform distortion generation mode is selected, and AC voltage VO with waveform distortion within the allowable range for load 24 is applied to load 24, thereby enhancing efficiency η of uninterruptible power supply apparatus 1. When it is necessary to drive load 24 with AC voltage VO with no waveform distortion, the sinusoidal wave output mode is selected, and AC voltage VO with a sinusoidal waveform and with no waveform distortion is applied to load 24.

Then, the operation of this uninterruptible power supply apparatus 1 will be hereinafter described. During the normal time when AC power is supplied from commercial AC power source 21, electromagnetic contactors 2, 8, 13 are turned ON while semiconductor switch 15 and electromagnetic contactor 16 are turned OFF. AC power supplied from commercial AC power source 21 is converted into DC power by converter 5. DC power generated by converter 5 is stored in battery 23 by bidirectional chopper 7 and is converted into AC power by inverter 10 and supplied to load 24.

When the sinusoidal wave output mode is selected during the normal time, as shown in FIG. 4(a), DC voltage 2×V1 is generated by converter 5 and AC voltage VO with a sinusoidal waveform is generated by inverter 10. When the waveform distortion generation mode is selected during the normal time, as shown in FIG. 4(b), DC voltage 2×V2 is generated by converter 5 and AC voltage VO with a trapezoidal waveform is generated by inverter 10, so that efficiency η of uninterruptible power supply apparatus 1 is enhanced.

During a power failure time when supply of AC power from commercial AC power source 21 is stopped, the operation of converter 5 is stopped and DC power in battery 23 is supplied to inverter 10 by bidirectional chopper 7. Inverter 10 converts DC power supplied from battery 23 through bidirectional chopper 7 into AC power, and supplies the converted AC power to load 24. Accordingly, also in the case of a power failure, the operation of load 24 can be continued as long as DC power is stored in battery 23.

When the sinusoidal wave output mode is selected during a power failure time, as shown in FIG. 4(a), DC voltage 2×V1 is generated by bidirectional chopper 7 and AC voltage VO with a sinusoidal waveform is generated by inverter 10. When the waveform distortion generation mode is selected during a power failure time, as shown in FIG. 4(b), DC voltage 2×V2 is generated by bidirectional chopper 7 and AC voltage VO with a trapezoidal waveform is generated by inverter 10, so that efficiency η of uninterruptible power supply apparatus 1 is enhanced.

In the case of a malfunction of inverter 10 during a normal time, semiconductor switch 15 is instantaneously turned ON and AC power is supplied from bypass AC power source 22 through semiconductor switch 15 to load 24. Then, electromagnetic contactor 16 is turned ON, electromagnetic contactor 13 is turned OFF, and semiconductor switch 15 is turned OFF. This causes AC power to be supplied from bypass AC power source 22 through electromagnetic contactor 16 to load 24.

As described above, in the present first embodiment, AC voltage VO selected from AC voltage VO with no waveform distortion and AC voltage VO with waveform distortion is supplied to load 24. Accordingly, efficiency η of uninterruptible power supply apparatus 1 can be enhanced as compared with the conventional case where only AC voltage VO with no waveform distortion can be supplied to load 24.

Also in the present first embodiment, DC voltage VDC is lowered to cause output voltage VO of inverter 10 to have waveform distortion. However, output voltage VO of inverter 10 may further be caused to have waveform distortion by lowering the switching frequencies at which switching elements 41 to 46 in inverter 10 are turned ON/OFF. In this case, since the number of times of turning ON/OFF switching elements 41 to 46 in inverter 10 is reduced, the switching losses in switching elements 41 to 46 can be reduced, so that efficiency η of uninterruptible power supply apparatus 1 can be further enhanced.

Second Embodiment

In the first embodiment, when the waveform distortion generation mode is selected, AC voltage VO with waveform distortion within the allowable range for load 24 is applied to load 24, with the result that efficiency η of uninterruptible power supply apparatus 1 is enhanced. In the present second embodiment, when the waveform distortion generation mode is selected, the level of output voltage VO is controlled so as to further enhance efficiency of uninterruptible power supply apparatus 1.

Figure 8:
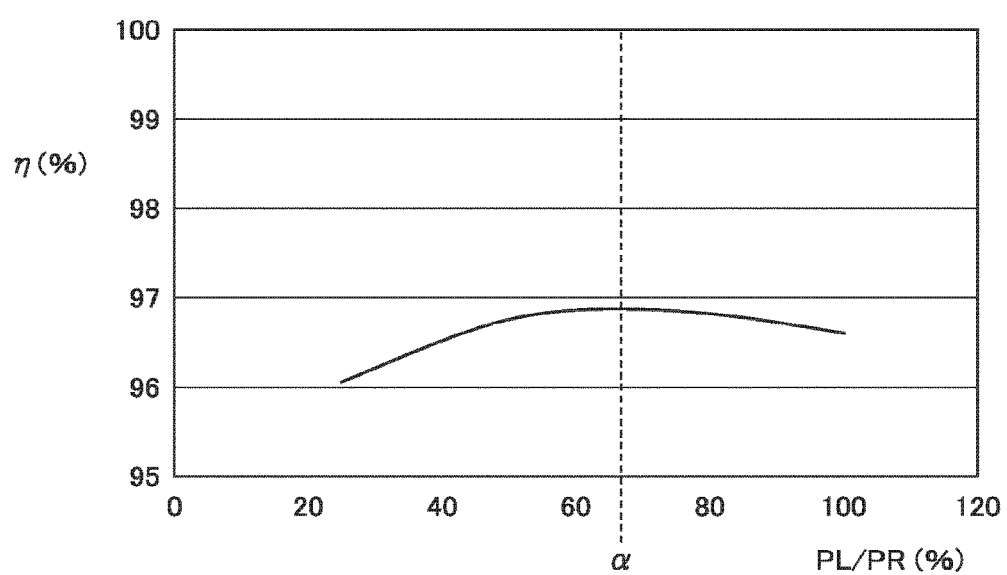
FIG. 8 is a diagram illustrating the principle of an uninterruptible power supply apparatus according to the second embodiment of the present invention.

FIG. 8 is a diagram showing the relation between ratio PL/PR (%) of load capacity PL to rated capacity PR of uninterruptible power supply apparatus 1 and efficiency η (%) of uninterruptible power supply apparatus 1. Efficiency η is ratio PO/PI (%) of AC power PO that is supplied to load 24, to AC power PI that is supplied from commercial AC power source 21.

As shown in FIG. 8, when ratio PL/PR (%) of load capacity PL to rated capacity PR is a predetermined value α (about 65% in the figure), efficiency η of uninterruptible power supply apparatus 1 reaches a maximum value ηmax. Efficiency η gradually decreases as PL/PR increases relative to predetermined value α, and gradually decreases as PL/PR decreases relative to predetermined value α.

The reason why efficiency η has a peak value ηmax is that a higher load current IO leads to a larger power consumption in resistance components, such as AC reactors 4, 11, whereas a lower load current IO leads to a higher ratio of consumption current of control device 18 to load current IO. Thus, the horizontal axis in FIG. 8 can be replaced with ratio IO/IR (%) of load current IO to rated current IR of uninterruptible power supply apparatus 1. Further, since rated current IR is constant, the horizontal axis in FIG. 8 can be replaced with the value of load current IO and α can be replaced with a predetermined value IOα of load current IO.

Accordingly, when power consumption of load 24 is kept constant and PL/PR is lower than predetermined value α, efficiency η can be enhanced by decreasing output voltage VO within a range of allowable input voltage of load 24 and by increasing load current IO within a range with an upper limit of IOα.

Further, when power consumption of load 24 is kept constant and PL/PR is higher than predetermined value α, efficiency η can be enhanced by increasing output voltage VO within a range of allowable input voltage of load 24 and by decreasing load current IO within a range with a lower limit of IOα.

Control of output voltage VO during the waveform distortion generation mode is carried out, for example, by controlling the values of amplitude A2 and DC voltage V2 while keeping a constant level of the ratio between amplitude A2 and DC voltage V2 shown in FIG. 4(b).

FIG. 9 is a flowchart showing the operation of control device 18 during the waveform distortion generation mode. Here, the mode is switched from the sinusoidal wave output mode to the waveform distortion generation mode by a user of uninterruptible power supply apparatus 1 operating operation unit 17. Accordingly, in step S1, control device 18 controls converter 5 (or bidirectional chopper 7) and inverter 10 to cause AC voltage VO to have waveform distortion within the allowable range for load 24.

Then, control device 18 detects output voltage VO and load current IO in step S2, calculates load capacity PL based on the detected values of VO and IO in step S3, and calculates PL/PR in step S4. Then, in step S5, control device 18 determines whether PL/PR is lower than a predetermined value α. If PL/PR<α, control device 18 goes on to step S6, whereas if PL/PR>α, control device 18 goes on to step S7.

In step S6, control device 18 decreases output voltage VO within a range of allowable input voltage of load 24 and increases load current IO within a range with an upper limit of IOα. In step S7, control device 18 increases output voltage VO within a range of allowable input voltage of load 24 and decreases load current IO within a range with a lower limit of IOα. In step S8, control device 18 fixes output voltage VO and continues the operation of load 24.

Rated capacity PR, predetermined values α, IOα, an allowable range of waveform distortion for load 24, and a range of allowable input voltage of load 24 are stored in control device 18 in advance.

For example, on the condition that the relation between PL/PR and efficiency η is as shown in FIG. 8, when PL/PR is 45%, PL/PR can be increased to 55% by decreasing output voltage VO by 10% and by increasing load current IO by 10%. Efficiency η can thus be enhanced. Since other configurations and operations are the same as those in the first embodiment, the description thereof will not be repeated.

As described above, in the present second embodiment, during the waveform distortion generation mode, output voltage VO of uninterruptible power supply apparatus 1 is controlled within the range of allowable input voltage of load 24 so as to increase efficiency η of uninterruptible power supply apparatus 1. Therefore, efficiency η of uninterruptible power supply apparatus 1 can be enhanced as compared with the case where output voltage VO is fixed at a certain rated voltage.

Furthermore, in the present second embodiment, when output voltage VO is lowered, DC voltage VDC is also lowered in order to keep the distortion ratio of output voltage VO (see FIG. 4(b)). Accordingly, the losses in switching elements 31 to 36 included in converter 5 and the losses in switching elements 41 to 46 included in inverter 10 can be reduced, so that efficiency η can be further enhanced.

FIG. 10 is a flowchart showing a modification of the second embodiment, which is compared with FIG. 9. Referring to FIG. 10, this modification is different from the second embodiment in that steps S8A and S8B are additionally included. After control device 18 performs steps S1 to S7, it determines in step S8A whether load current IO is stable or not at a fixed value. If control device 18 determines that load current IO is stable at a fixed value, it fixes output voltage VO in step S8 and continues the operation of load 24. If control device 18 determines that load current IO is not stable at a fixed value, then in step S8B, it resets output voltage VO to a rated voltage VOR and continues the operation of load 24.

In the present modification, the same effects as those in the second embodiment can be achieved. In addition, if load current IO becomes unstable when output voltage VO is increased or decreased, output voltage VO is reset to rated voltage VOR so that load current IO can be stabilized.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

1 uninterruptible power supply apparatus, T1 AC input terminal, T2 bypass input terminal, T3 battery terminal, T4 AC output terminal, 2, 8, 13, 16 electromagnetic contactor, 3, 6 protective fuse, 4, 11 AC reactor, 5 converter, 7 bidirectional chopper, 9 smoothing electrolytic capacitor, 10 inverter, 12 capacitor, 14 current detector, 15 semiconductor switch, 17 operation unit, 18 control device, 21 commercial AC power source, 22 bypass AC power source, 23 battery, 24 load, 31 to 36, 41 to 46, 51, 52 switching element, 53 to 55, 61 diode, 60 IGBT, 62 NPN bipolar transistor.

The invention claimed is:

1. An uninterruptible power supply apparatus comprising:
a converter configured to convert AC power supplied from a commercial AC power source into DC power;
an inverter configured to convert DC power into AC power and supply the AC power to a load; and
a control device configured to control the converter and the inverter,
during a normal time when the AC power is supplied from the commercial AC power source, the DC power generated in the converter being supplied to the inverter and stored in a power storage device, and during a power failure time when supply of the AC power from the commercial AC power source is stopped, the DC power in the power storage device being supplied to the inverter,
the control device being configured to execute a mode selected from a first mode and a second mode, in the first mode, a first AC voltage with a sinusoidal waveform and with no waveform distortion being supplied to the load, and in the second mode, a second AC voltage with a waveform distortion within an allowable range for the load being supplied to the load,
the control device being configured to:
when the first mode is selected during the normal time, control the converter to output a first DC voltage and control the inverter to output the first AC voltage with a sinusoidal waveform and with an amplitude smaller than one-half of the first DC voltage; and
when the second mode is selected during the normal time, control the converter to output a second DC voltage smaller than the first DC voltage and control the inverter to output the second AC voltage with a sinusoidal waveform and with an amplitude larger than one-half of the second DC voltage.

2. The uninterruptible power supply apparatus according to claim 1, wherein the uninterruptible power supply apparatus has an efficiency that is higher during execution of the second mode than during execution of the first mode.

3. The uninterruptible power supply apparatus according to claim 1, wherein the second AC voltage with the waveform distortion has a trapezoidal waveform.

4. The uninterruptible power supply apparatus according to claim 1, further comprising a bidirectional chopper configured to supply the DC power generated in the converter to the power storage device during the normal time, and supply the DC power in the power storage device to the inverter during the power failure time.

5. The uninterruptible power supply apparatus according to claim 1, wherein the control device is configured to set a switching frequency of the inverter to be smaller when the second mode is selected than when the first mode is selected.

6. An uninterruptible power supply apparatus comprising:
a converter configured to convert AC power supplied from a commercial AC power source into DC power;
an inverter configured to convert DC power into AC power and supply the AC power to a load; and
a control device configured to control the converter and the inverter,
during a normal time when the AC power is supplied from the commercial AC power source, the DC power generated in the converter being supplied to the inverter and stored in a power storage device, and during a power failure time when supply of the AC power from the commercial AC power source is stopped, the DC power in the power storage device being supplied to the inverter,
the control device being configured to execute a mode selected from a first mode and a second mode, in the first mode, a first AC voltage with a sinusoidal waveform and with no waveform distortion being supplied to the load, and in the second mode, a second AC voltage with a waveform distortion within an allowable range for the load being supplied to the load,
the load being configured to receive an AC voltage within a range of allowable input voltage to consume constant AC power,
the uninterruptible power supply apparatus having an efficiency that is maximized when a ratio of a load capacity to a rated capacity of the uninterruptible power supply apparatus is a predetermined value,
the control device being configured to control an output voltage of the inverter within the range of allowable input voltage so as to increase the efficiency, when the second mode is selected and when the ratio of the load capacity to the rated capacity is different from the predetermined value.

7. The uninterruptible power supply apparatus according to claim 6, wherein the control device is configured to decrease an output voltage of the inverter within the range of allowable input voltage of the load and increase a load current so as to increase the efficiency, when the ratio of the load capacity to the rated capacity is lower than the predetermined value.

8. The uninterruptible power supply apparatus according to claim 6, wherein the control device is configured to increase an output voltage of the inverter within the range of allowable input voltage and decrease a load current so as to increase the efficiency, when the ratio of the load capacity to the rated capacity is higher than the predetermined value.

9. The uninterruptible power supply apparatus according to claim 6, wherein the control device is configured to set an output voltage of the inverter at a rated voltage when the control device controls the output voltage of the inverter and a load current is varied.

10. The uninterruptible power supply apparatus according to claim 6, wherein the uninterruptible power supply apparatus has an efficiency that is higher during execution of the second mode than during execution of the first mode.

11. The uninterruptible power supply apparatus according to claim 6, wherein the second AC voltage with the waveform distortion has a trapezoidal waveform.

* * * * *